(12) United States Patent
Bella et al.

(10) Patent No.: US 11,114,837 B2
(45) Date of Patent: *Sep. 7, 2021

(54) GROUND OVERCURRENT CONTROL SYSTEM AND METHODS OF USING SAME

(71) Applicant: Molex, LLC, Lisle, IL (US)

(72) Inventors: Gregory L. Bella, Naperville, IL (US); Jeffrey R. Ciarlette, Lockport, IL (US)

(73) Assignee: Molex, LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,424

(22) Filed: Feb. 23, 2020

(65) Prior Publication Data
US 2020/0195005 A1 Jun. 18, 2020

Related U.S. Application Data

(63) Continuation of application No. 15/381,237, filed on Dec. 16, 2016, now Pat. No. 10,574,049.
(Continued)

(51) Int. Cl.
*H02H 3/14* (2006.01)
*H02H 3/16* (2006.01)
(Continued)

(52) U.S. Cl.
CPC ............ *H02H 3/14* (2013.01); *H01R 13/7135* (2013.01); *H02H 3/066* (2013.01); *H02H 3/087* (2013.01); *H02H 3/16* (2013.01); *H02H 9/025* (2013.01)

(58) Field of Classification Search
CPC ............ H02H 3/08; H02H 3/087; H02H 3/16; H02H 9/02; H02H 9/025; H02H 3/14–16;
(Continued)

(56) References Cited

U.S. PATENT DOCUMENTS 4,394,703 A 7/1983 Butcher
4,979,070 A 12/1990 Bodkin
(Continued)

FOREIGN PATENT DOCUMENTS

CN 102545139 A 7/2012
CN 203278183 A 11/2013
(Continued)

OTHER PUBLICATIONS

Office Action received for Japanese application No. 2018-531600, dated May 28, 2019, 6 pages. (3 pages of English Translation and 3 pages of Official Copy).
(Continued)

*Primary Examiner* — Jared Fureman
*Assistant Examiner* — Christopher J Clark

(57) ABSTRACT

A ground overcurrent control system includes ground circuit with a first section and a second section. The first section is electrically connected to a ground member of an electrical connector and the second section is electrically connected to a ground reference. A switch element is positioned between the first section of the ground circuit and the second section of the ground circuit. A controller is configured to determine the current within the ground circuit while current is passing through the switch element and, upon the current exceeding a current threshold, the switch element is modified to an open condition. Upon determining that the voltage between the first section of the ground circuit and the ground reference is less than a voltage threshold, a command is generated to modify the switch element back to a closed condition.

9 Claims, 3 Drawing Sheets

Related U.S. Application Data

(60) Provisional application No. 62/268,739, filed on Dec. 17, 2015.

(51) Int. Cl.
*H01R 13/713* (2006.01)
*H02H 3/087* (2006.01)
*H02H 3/06* (2006.01)
*H02H 9/02* (2006.01)

(58) Field of Classification Search
CPC ..... H01R 13/7135; H04M 3/18; G01R 27/20; G01R 27/205
See application file for complete search history.

(56) References Cited

U.S. PATENT DOCUMENTS

| | | | |
|---|---|---|---|
| 5,426,553 A | | 6/1995 | Kim |
| 6,011,416 A | * | 1/2000 | Mizuno ............ H03K 17/0822 327/108 |
| 9,136,693 B1 | * | 9/2015 | Flegel ................ H02H 3/16 |
| 10,574,049 B2 | * | 2/2020 | Bella ................ H02H 3/066 |
| 2003/0218847 A1 | * | 11/2003 | Lesesky ............ H02H 3/087 361/100 |
| 2005/0185354 A1 | | 8/2005 | Hoopes |
| 2008/0080116 A1 | | 4/2008 | Qin et al. |
| 2009/0085576 A1 | | 4/2009 | Lenzie et al. |
| 2009/0273874 A1 | | 11/2009 | Yen |
| 2010/0214703 A1 | | 8/2010 | Tofigh et al. |
| 2011/0026525 A1 | | 2/2011 | He |
| 2011/0110008 A1 | | 5/2011 | Liao |
| 2012/0293017 A1 | * | 11/2012 | Lidsky ............... H02H 3/087 307/126 |
| 2015/0229119 A1 | | 8/2015 | Tao et al. |
| 2016/0134100 A1 | | 5/2016 | Beierschmitt et al. |
| 2016/0134105 A1 | | 5/2016 | Harris et al. |
| 2016/0172840 A1 | | 6/2016 | Luebke et al. |
| 2016/0172844 A1 | | 6/2016 | van Dijk |
| 2016/0202304 A1 | | 7/2016 | Beierschmitt et al. |

FOREIGN PATENT DOCUMENTS

| | | |
|---|---|---|
| CN | 103515923 A | 1/2014 |
| CN | 104979881 A | 10/2015 |
| EP | 0291169 A1 | 11/1988 |
| JP | 2001-045651 A | 2/2001 |
| JP | 2008-009898 A | 1/2008 |
| JP | 2012-003631 A | 1/2012 |
| JP | 2015-023699 A | 2/2015 |
| WO | 2015/008782 A1 | 1/2015 |
| WO | 2017/106589 A1 | 6/2017 |

OTHER PUBLICATIONS

International Search Report and Written Opinion received for PCT application No. PCT/US2016/067077, dated Mar. 31, 2017, 12 pages.
International Preliminary Report on Patentability received for PCT application No. PCT/US2016/067077, dated Jun. 28, 2018, 11 pages.
Notice of Allowance received for U.S. Appl. No. 15/381,237, dated Oct. 17, 2019, 11 pages.
Extended European Search Report and Opinion received for EP application No. 16876739.0, dated Aug. 5, 2019, 6 pages.

* cited by examiner

GROUND OVERCURRENT CONTROL SYSTEM AND METHODS OF USING SAME

RELATED APPLICATIONS

This application claims priority to U.S. application Ser. No. 15/381,237, filed Dec. 16, 2016, now U.S. Pat. No. 10,574,049, which in turn claims priority to U.S. provisional patent application Ser. No. 62/268,739, filed Dec. 17, 2015, both of which are incorporated herein by reference in their entirety.

TECHNICAL FIELD

This disclosure relates generally to the field of electrical device protection and, more particularly, to a system and method of controlling excessive current on ground circuits associated with a device.

DESCRIPTION OF RELATED ART

The use of electronic devices such as smartphones, tablets, music devices, and other portable devices has become more prevalent. Multimedia stations and other components often include a plurality of power receptacles or ports for charging such devices. In many instances, all of the power receptacles or ports may not have a device connected thereto. In some instances, a cable assembly may be plugged into one of the power receptacles or ports but is not connected to an electronic device. The unplugged end of the cable assembly may have an exposed ground or shield member.

Further, in some instances, a cable assembly may not be plugged into one of the power receptacles or ports so that a power terminal or contact is exposed. For example, a cylindrical 12 V power receptacle includes a cylindrical ground member that surrounds a central power terminal or contact. If the unplugged end of a cable assembly enters an unused power receptacle or port such as a 12 V power receptacle, the shield member at the unplugged end may contact the power terminal or contact. Such contact may cause current to travel along the ground circuit of the cable assembly and to the device into which the opposite end of the cable assembly is plugged. Excessive current within the ground circuit may cause damage depending upon the resistance of the cable assembly, the ground circuit and the components to which the ground circuit is connected.

It would be desirable to provide a system and method which overcome the disadvantages of the prior art ground circuit protection systems. More specifically, it would be desirable to provide a system and method for automatically detecting overcurrent conditions and reducing or eliminating the overcurrent condition until the cause of the overcurrent condition has been eliminated. The benefit of such a system would be to protect the components and devices connected to the ground circuit and to permit normal operation after the cause of the overcurrent condition has been terminated.

SUMMARY

A ground overcurrent control system and methods of using same are provided. In one aspect, a ground overcurrent control system includes a controller, an electrical connector, a ground circuit, a switch element, a first sensor system, and a second sensor system. The electrical connector includes a ground member and the ground circuit includes a first section and a second section. The first section is electrically connected to the ground member of the electrical connector and the second section is electrically connected to a ground reference. The switch element is operatively positioned between the first section of the ground circuit and the second section of the ground circuit. The switch element is configured to operate in a first condition in which the first section and the second section are electrically connected and a second condition in which the first section and the second section are electrically isolated. The first sensor system is configured to generate first signals indicative of a current passing through the first and second sections of the ground circuit while the switch element is in the first condition. The second sensor system is configured to generate second signals indicative of a voltage between the first section of the ground circuit and the ground reference while the switch element is in the second condition. The controller is configured to store a current threshold and a voltage threshold, receive the first signals from the first sensor system, and determine the current within the ground circuit based upon the first signals while the switch element is in the first condition. Upon the current exceeding the current threshold, the controller is configured to generate a command to modify the switch element from the first condition to the second condition and upon modifying the switch element from the first condition to the second condition, receive the second signals from the second sensor. The controller is further configured to determine the voltage between the first section of the ground circuit and the ground reference while the switch element is in the second condition and, upon the voltage being less than the voltage threshold, generate a command to modify the switch element from the second condition to the first condition.

In another aspect, a method of controlling overcurrent on a ground circuit is provided. The ground circuit includes a first section and a second section with the first section being electrically connected to a ground member of an electrical connector and the second section being electrically connected to a ground reference. A switch element is operatively positioned between the first section of the ground circuit and the second section of the ground circuit and is configured to operate in a first condition in which the first section and the second section are electrically connected and a second condition in which the first section and the second section are electrically isolated. The method includes storing a current threshold and a voltage threshold, while the switch element is in the first condition, receiving first signals from a first sensor system indicative of a current passing through the first and second sections of the ground circuit, and determining the current within the ground circuit based upon the first signals while the switch element is in the first condition. Upon the current exceeding the current threshold, generating a command to modify the switch element from the first condition to the second condition, and upon modifying the switch element from the first condition to the second condition, receiving second signals from a second sensor indicative of a voltage between the first section of the ground circuit and the ground reference. The method further includes determining the voltage between the first section of the ground circuit and the ground reference while the switch element is in the second condition and, upon the voltage being less than the voltage threshold, generating a command to modify the switch element from the second condition to the first condition.

BRIEF DESCRIPTION OF THE DRAWINGS

The present invention is illustrated by way of example and not limited in the accompanying figures in which like reference numerals indicate similar elements and in which.

DETAILED DESCRIPTION

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

Figure 1:
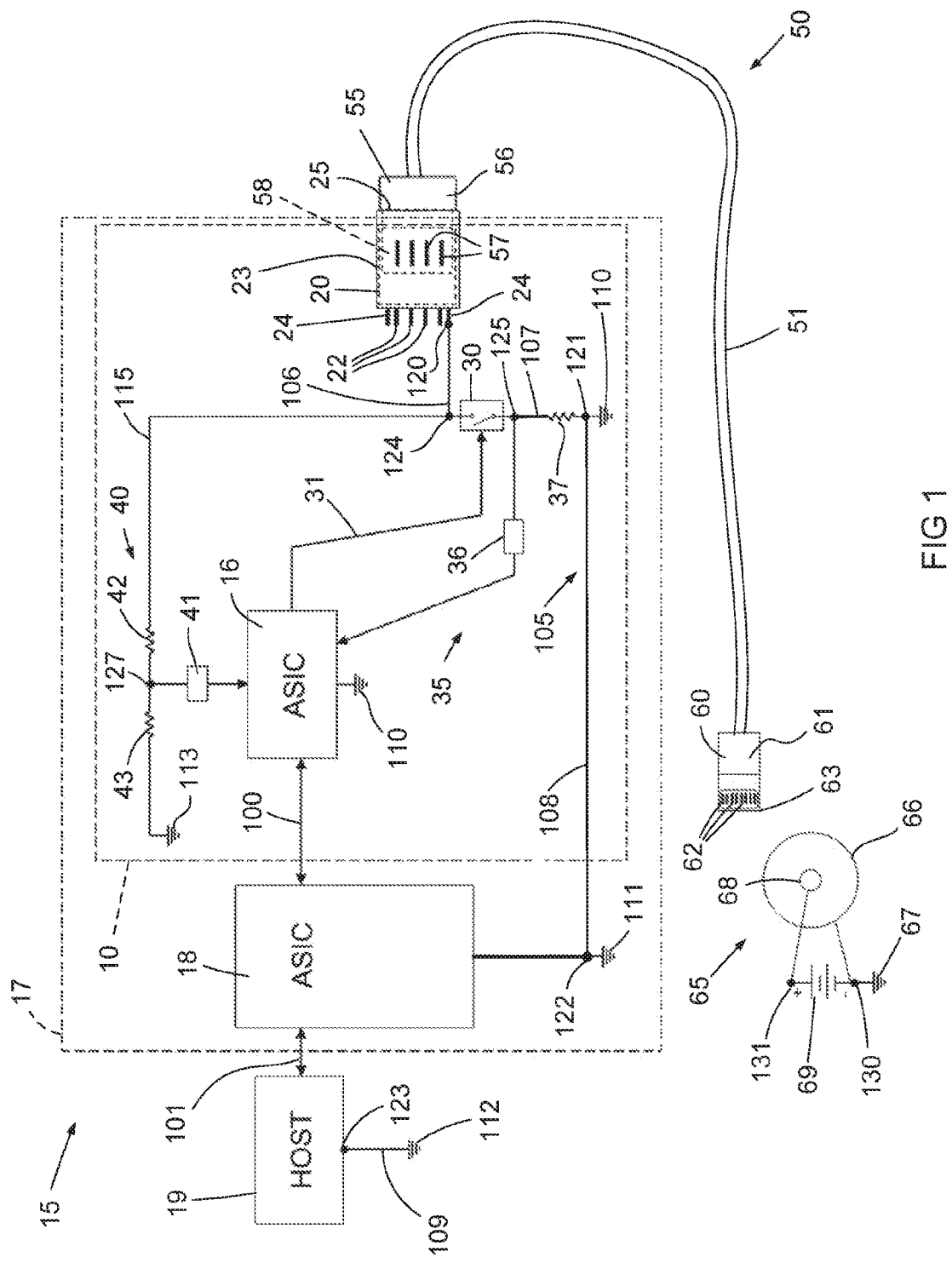
FIG. 1 illustrates a block diagram of a first exemplary embodiment of a system incorporating the ground overcurrent control system as described herein.

A block diagram of a first exemplary embodiment of a ground overcurrent control system or module is indicated by dashed line 10 in FIG. 1.

In the first exemplary embodiment, the ground overcurrent control system 10 is depicted as including a controller 15, one or more electrical connectors 20, a ground circuit switch element 30, a first sensor system 35, a second sensor system 40, and a ground or reference circuit 105.

The ground overcurrent control system 10 may be associated with and controlled by any type of controller 15 that is acceptable for its intended application, as will be readily understood by one skilled in the art. The controller 15 can be an electronic controller that operates in a logical fashion to perform operations, execute control algorithms, store and retrieve data and other desired operations. The controller 15 can include or access memory, secondary storage devices, processors, and any other components for running an application. The memory and secondary storage devices can be in the form of read-only memory (ROM), random access memory (RAM) or integrated circuitry that is accessible by the controller. Various other circuits can be associated with the controller such as power supply circuitry, signal conditioning circuitry, driver circuitry, and other types of circuitry.

The controller 15 may be a single controller or may include more than one controller disposed to control various functions and/or features. The term "controller" is meant to be used in its broadest sense to include one or more controllers, state machines, and/or microprocessors that may be associated with the ground overcurrent control system and that may cooperate in controlling various functions and operations related to or associated with the ground overcurrent control system 10. The functionality of the controller 15 can be implemented in hardware and/or software without regard to the functionality. The controller 15 may rely on one or more data maps relating to the operating conditions and the operating environment of the ground overcurrent control system 10 that may be stored in the memory. Each of these data maps may include a collection of data in the form of tables, graphs, and/or equations. Such data maps may be updated from time to time in any desired manner. As depicted, the controller 15 includes an application-specific integrated circuit (ASIC) 16.

The ASIC 16 may be connected to a power source (not shown), such as a battery or the like, in a vehicle such that the power source delivers power to the ASIC 16. The ground overcurrent control system 10 may form a part of another module such as multimedia connectivity module, as indicated by dashed line 17, that includes one or more additional ASICs 18 with the ASIC 16 operatively connected to the ASICs 18 as depicted at 100. The multimedia connectivity module 17 may be operatively connected to an auto infotainment head end unit, another electronic control, or host 19 (and thus is operatively connected to the ASIC 16) via connection 101. In another embodiment, the ground overcurrent control system 10 may be separate from but operatively connected to the multimedia connectivity module 17. The multimedia connectivity module 17 and/or host 19 may form a portion of the controller 15.

Ground overcurrent control system 10 includes one or more module-based electrical connectors 20. The electrical connectors 20 may have any configuration. In one embodiment, the electrical connectors 20 may have an insulative housing 21 upon or in which a plurality of electrically conductive signal contacts or terminals 22 are mounted. In FIG. 1, only a portion of connection portions or tails of the electrically conductive signal terminals 22 are visible. An electrically conductive ground or shield member 23 may generally surround the housing 21 and portions of the electrically conductive signal terminals 22. The ground member 23 may include one or more connection portions 24. A mating end 25 of the ground member 23 includes an opening (not shown) to form a receptacle into which a mating electrical connector 55 may be inserted.

The ground or reference circuit 105 includes a first section 106 that is electrically connected to one of the connection portions 24 of the ground member 23 of electrical connector 20 such as at node 120. A second section 107 of the ground circuit 105 is connected to an overcurrent control system ground or reference 110 at node 121. As used herein, the term "ground reference" refers to a ground or reference voltage that may or may not be equal to zero. ASIC 16 is also depicted as including a connection to overcurrent control system ground reference 110.

The second section 107 is also connected to other portions of the ground circuit 105 such as a portion or segment 108 that extends from node 121 and is electrically connected to the multimedia connectivity module 17 and the multimedia connectivity module ground reference 111 at node 122. The second section 107 is also indirectly connected to a portion or segment 109 of the ground circuit 105 within the host 19, which is connected to the host ground reference 112 at node 123. In many embodiments, each of the ground references 110-112 may be at the same potential. In some instances, the ground circuit 105 of the multimedia connectivity module 17 and the ground circuit of the host 19 may be interconnected through a cable that forms the connection 101.

Switch element 30 is electrically connected to the first section 106 of the ground circuit 105 at node 124 and to the second section 107 at node 125. Switch element 30 is configured to operate in a first or closed condition in which the first section 106 of the ground circuit 105 and the second section 107 of the ground circuit are electrically connected and a second or open condition in which the first section and the second section of the ground circuit are electrically isolated. In other words, switch element 30 operates to open and close the connection between the first and second sections 106, 107 of the ground circuit 105. As depicted in FIG. 1, the switch element 30 is in the second condition with the first and second sections 106, 107 of the ground circuit 105 electrically isolated.

Switch element 30 may be any type of switch that interrupts or diverts the flow of current. In one embodiment, the switch element may be a FET, such as a MOSFET. In other embodiments, the switch element 30 may be an electromechanical switch such as a relay. As depicted in FIG. 1, the switch element 30 is a FET and is operatively connected to the ASIC 16. More specifically, the switch element 30 is actuated by signals from the ASIC 16 via electrical connection 31.

The first sensor system, generally indicated at 35, operates to monitor or determine the amount of current passing through the first and second sections 106, 107 of the ground circuit 105 when the switch element 30 is closed. In the embodiment depicted in FIG. 1, the first sensor system 35 includes a voltage sensor 36 and a resistor 37 associated with the voltage sensor. The voltage sensor 36 extends between node 125 and the ASIC 16. The resistor 37 extends between node 121 associated with overcurrent control system ground 110 and node 125 along the second section 107 of the ground circuit 105. Based upon a known value of resistance of the resistor 37 and the voltage between node 125 and the overcurrent control system ground reference 110 at node 121, the amount of current passing through the resistor 37 may be determined. The current passing through the resistor 37 will be equal to the current passing through the switch element 30 (when in the closed condition) and the second section 107 of the ground circuit 105.

The first sensor system 35 may be any type of sensor or system that will generate signals, directly or indirectly, indicative of the current passing through the switch element 30, when it is in its closed position, and through the second section 107 of the ground circuit 105 to the overcurrent control system ground reference 110. In the embodiment depicted in FIG. 1, the voltage sensor 36 may be configured as an analog-to-digital converter. The value of the resistor 37 may be selected based upon the characteristics of the voltage sensor 36, the ASIC 16, and other aspects of the ground circuit 105. For example, it may be desirable for the resistance of the resistor 37 to be low enough so that any current passing through the ground circuit 105 and the switch element 30 passes through the resistor 37 to the ground reference 110 rather than passing through the portion 108 of the ground circuit 105 electrically connected to the multimedia connectivity module 17. In other words, it may be desirable for the resistance of the resistor 37 to be as low as or lower than the resistance of the portion 108 of the ground circuit 105. In one embodiment, the resistance may be approximately 0.01Ω. In other embodiments, the resistance may be between 0.005-0.015Ω.

The first sensor system 35 may be configured in other manners. For example, rather than using an analog-to-digital converter to determine the voltage at node 125 and using the ASIC 16 to compare the sensed voltage to a threshold, the analog-to-digital converter may be replaced with a voltage comparator. In such case, the voltage comparator may be selected or configured to generate a signal upon the voltage at node 125 exceeding a threshold value. Once the threshold voltage has been exceeded, the threshold current through the second section 107 of the ground circuit 105 will also have been exceeded.

Still further, in another embodiment, the resistor 37 may be replaced by the internal resistance of the switch element 30 and the connection of the voltage sensor 36 adjacent the second section 107 of the ground circuit 105 moved from node 125 (i.e., after the switch element) to node 124 (i.e., before the switch element). In such an example, the switch element 30 may be a electronic switch such as a FET that includes an internal resistance that may be readily measured or otherwise determined.

In still other embodiments, it may be possible to use a current sensor or a current comparator to determine when the current through the second section 107 of the ground circuit 105 exceeds a threshold current.

The second sensor system, generally indicated at 40, operates to monitor or determine the voltage at the first section 106 of the ground circuit 105 once the switch element 30 is opened. In the embodiment depicted in FIG. 1, the second sensor system 40 includes a voltage sensor 41, and an auxiliary segment or leg 115 of the ground circuit 105 that is electrically connected to node 124. The auxiliary segment 115 may include a first resistor 42 and a second resistor 43 connected in series between the node 124 and an auxiliary ground reference 113. Auxiliary ground reference 113 may be at the same potential as the overcurrent control system ground reference 110.

The voltage sensor 41 extends between node 127, located between the first resistor 42 and the second resistor 43, and the ASIC 16. In the embodiment depicted in FIG. 1, the voltage sensor 41 may be configured as an analog-to-digital converter. The values of the first and second resistors 42, 43 may be selected based upon the characteristics of the voltage sensor 41, the ASIC 16, and other aspects of the ground circuit 105. For example, in a first aspect, it may be desirable for the resistance of the first and second resistors 42, 43 to be high enough so that, when the switch element 30 is closed, any current passing through the ground circuit 105 passes through the switch element 30 and the resistor 37 to the overcurrent control system ground reference 110 rather than passing through the auxiliary segment 115 of the ground circuit 105. In a second aspect, the resistances of the first resistor 42 and the second resistor 43 may be selected so that the voltage to be analyzed at node 127 will be within a desired range.

It should be noted that the resistance of resistor 37 is relatively small and the resistances of resistors 42 and 43 are relatively large to permit the ground circuit 105 to operate in a typical manner while the switch element 30 is closed. With such a configuration, while the switch element 30 is closed, essentially all of the current passing along the ground circuit 105 will pass through the first and second sections 106, 107 of the ground circuit 105 rather than the auxiliary segment 115 of the ground circuit 105.

The value of the first resistor 42 and the second resistor 43 may be selected based upon the characteristics of the voltage sensor 41, the ASIC 16, and other aspects of the ground circuit 105. In one embodiment, the resistance of the first resistor 42 may be approximately 38K Ω and the resistance of the second resistor 43 may be approximately 10K Ω.

The second sensor system 40 may be configured in other manners. For example, rather than using an analog-to-digital converter 41 to determine the voltage at node 127 and using the ASIC 16 to compare the sensed voltage to a threshold voltage, the analog-to-digital converter may be replaced with a voltage comparator. In such case, the voltage comparator may be selected or configured to generate a signal upon the voltage at node 127 exceeding a threshold value. Still further, it may be possible to use a current sensor or a current comparator to determine when the voltage at node 127 exceeds the threshold voltage.

Module based electrical connector 20 is configured to be mated to a cable assembly 50. Cable assembly 50 includes an electrical cable 51, a first electrical connector 55, and a second electrical connector 60, with the electrical cable 51 extending between the first and second electrical connectors 55, 60. The electrical cable 51 includes a plurality of wires or conductors (not shown) therein. In some embodiments, the electrical cable 51 may include a shield or ground member surrounding the wires or conductors. In other embodiments, one or more of the wires within the electrical cable 51 may operate as a ground member.

First electrical connector 55 includes a housing 56 upon or in which a plurality of electrically conductive signal contacts or terminals 57 are mounted. An electrically conductive ground or shield member 58 surrounds at least a portion of the housing 56 and signal terminals 57. Each of the signal terminals 57 may be electrically connected or terminated to one of the wires of the electrical cable 51. Wires or the shield or ground member of the electrical cable 51 may be electrically connected or terminated to the ground member 58 of the first electrical connector 55.

Second electrical connector 60 includes a housing 61 upon or in which a plurality of electrically conductive signal contacts or terminals 62 are mounted. An electrically conductive ground or shield member 63 surrounds at least a portion of the housing 61 and signal terminals 62. Each of the terminals 62 may be electrically connected or terminated to one of the wires of the electrical cable 51. Wires or the shield or ground member of the electrical cable 51 may be electrically connected or terminated to the ground member 63 of the second electrical connector 60.

Each of the signal terminals 57 of the first electrical connector 55 may be electrically connected to one of the signal terminals 62 of the second electrical connector 60 and the ground member 58 of the first electrical connector 55 is electrically connected to the ground member 63 of the second electrical connector 60 through the electrical cable 51. One or both of the first and second electrical connectors 55, 60 may include electronic circuitry or components (not shown). Accordingly, there may not be a one-to-one correspondence between the terminals 57 of the first electrical connector 55 and the terminals 62 of the second electrical connector 60. In addition, under some circumstances, the electronic circuitry or components within an electrical connector may permit current to pass between the signal terminals of the connector and the ground circuitry. Further, although referred to as signal terminals 57, 62, in some embodiments, each of the signal terminals may not be used to transmit signals.

Upon inserting first electrical connector 55 into the module-based electrical connector 20 of the ground overcurrent control system 10, the signal terminals 57 of the first electrical connector 55 will mate with and be electrically connected to the signal terminals 22 of the module-based electrical connector 20. As a result, the signal terminals 22 of the module-based electrical connector 20 will also be electrically connected to the signal terminals 62 of the second electrical connector 60. In addition, the ground member 58 of the first electrical connector 55 will mate with and be electrically connected to the ground member 23 of the module-based electrical connector 20. As a result, ground member 23 of the module-based electrical connector 20 will also be electrically connected to the ground member 63 of the second electrical connector 60.

In some operating environments, such as a vehicle, the first electrical connector 55 of the cable assembly 50 may be inserted into or mated with the module-based electrical connector 20 while the second electrical connector 60 remains unmated. As a result of the flexibility of electrical cable 51, the second electrical connector 60 may move relative to its operating environment. In some operating environments, the second electrical connector 60 may be in proximity to additional power sources such as 12 V cylindrical power outlets 65.

A 12 V cylindrical power outlet or receptacle 65 includes a cylindrical body 66 that is electrically connected to a ground reference 67 at node 130 and a center power contact 68 connected to a 12 V power supply 69 at node 131. If the ground member 63 of the second electrical connector 60 contacts the center power contact 68, current may be transmitted through the shield or other conductors of the electrical cable 51 to the ground member 58 of the first electrical connector 55. The electrical connection between the ground member 58 of the first electrical connector 55 and the ground member 23 of the module-based electrical connector 20 will result in current on the ground circuit 105 of the ground overcurrent control system 10.

In some operating environments, a power source such as the 12 V cylindrical power outlet 65 may provide twenty (20) A of current and may be coupled with a fuse that permits the transmission of current far in excess of twenty (20) A. For example, in one application, such a 12 V cylindrical power outlet 65 may be used with a fuse that may permit transmission of sixty (60) A for two seconds before blowing or tripping the fuse. The cable assembly 50, the module-based electrical connector 20, the first and second electrical connectors 55, 60, components of the multimedia connectivity module 17 and the host 19 as well as the interconnections therebetween may not be rated or configured to handle large amounts of current. Accordingly, inadvertent and/or undesired transmission of large amounts of current through the aforementioned components and the ground circuit 105 may result in damage to such components.

The ground overcurrent control system 10 is operative to respond to conditions in which the current passing along the ground circuit 105 and components connected thereto exceeds a threshold current in order to protect the cable assembly 50, the module-based electrical connector 20, the first and second electrical connectors 55, 60, components of the multimedia connectivity module 17 and the host 19 as well as the interconnections therebetween.

Figure 2:
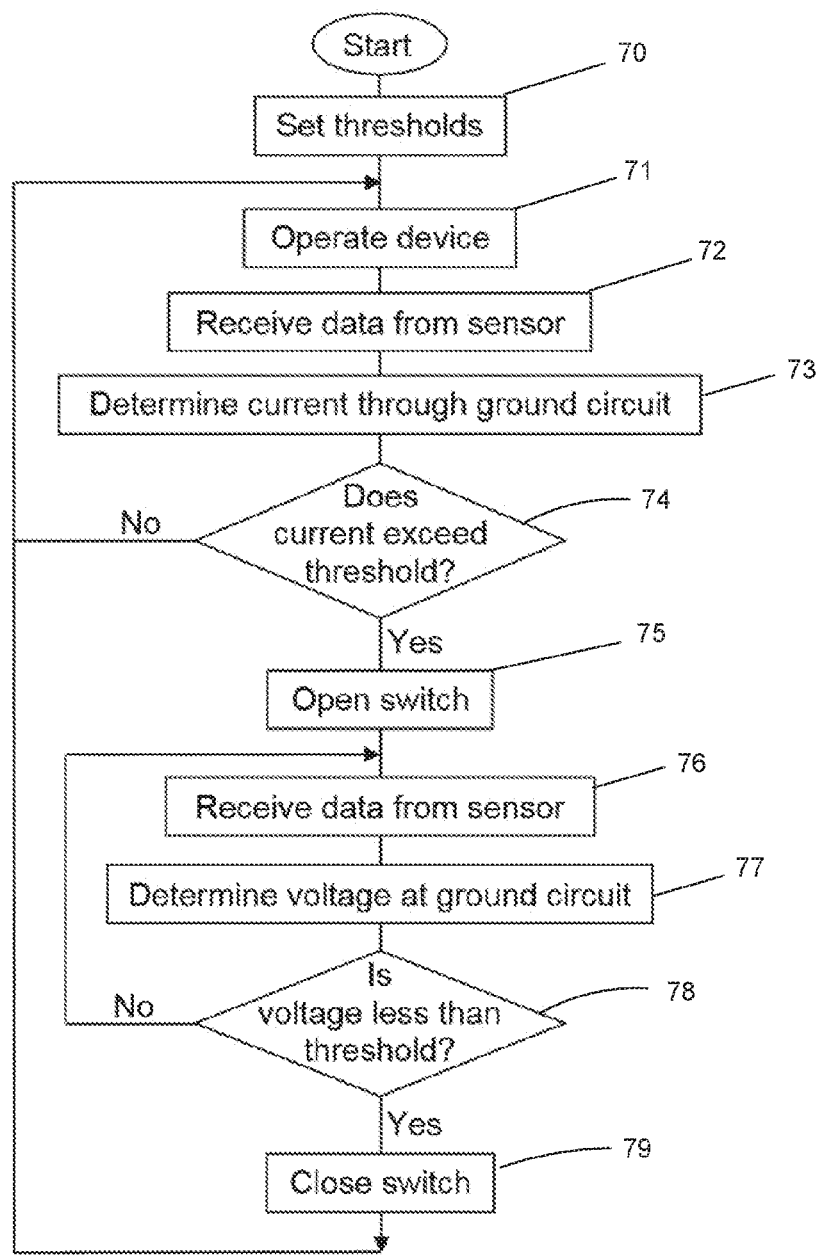
FIG. 2 illustrates a flowchart of a manner of operating the ground overcurrent control system of FIG. 1.

FIG. 2 depicts a flowchart of one manner of operation of the ground overcurrent control system 10. At stage 70, the current threshold corresponding to the maximum current that may pass through the ground circuit 105 before actuating the switch element 30 may be set or stored within the controller 15. In addition, the voltage threshold corresponding to the maximum voltage permitted at the ground connection 24 of the module-based electrical connector 20 before the switch element 30 will be closed during the operation of the ground overcurrent control system 10 may be set or stored within the ASIC 16. The current threshold and the voltage threshold may be set or stored in any manner. For example, the thresholds may be set or stored during the manufacture of the ground overcurrent control system 10 or any other time as desired to control the operation of the ground overcurrent control system 10.

At stage 71, the device or system that includes the ground overcurrent control system 10, such as the multimedia connectivity module 17 may be operated. Data may be received at stage 72 by the ASIC 16 from the voltage sensor 36. The data may be received at any desired rate or frequency. In one example, the data may be received once every millisecond. At stage 73, the ASIC 16 may determine the current passing through the first and second sections 106, 107 of the ground circuit 105. To do so, the ASIC 16 may receive signals from the voltage sensor 36 indicative of the voltage between node 125 and overcurrent control system ground reference 110 across the resistor 37. Based upon the voltage and the known resistance of resistor 37, the current through the first and second sections 106, 107 of the ground circuit 105 may be determined.

In some applications, the ASIC 16 may be configured to analyze a plurality of data samples to determine the current passing through the first and second sections 106, 107 of the ground circuit 105. Such analysis may be performed in any desired manner. In one embodiment, the ASIC 16 may analyze a plurality of data samples over a predetermined period of time and utilize an average of the received data samples. In other embodiments or in addition, the ASIC 16 may analyze a plurality of data samples over a predetermined period of time and utilize the maximum of the receive data samples. In one example, the ASIC 16 may analyze groups of ten data samples to generate a current value. In some instances, procedures or methods may be utilized to eliminate erroneous data samples. Other processes are contemplated.

Upon determining the sensed current passing through the first and second sections 106, 107 of the ground circuit 105, the ASIC 16 may compare the sensed current to the current threshold at decision stage 74 to determine whether the sensed current exceeds the current threshold. If the sensed current does not exceed the current threshold, the device or system such as the multimedia connectivity system 17 that includes the ground overcurrent control system 10 may continue to operate and stages 71-74 repeated.

If the sensed current exceeds the current threshold, the ASIC 16 generates at stage 75 a signal along the electrical connection 31 to open the switch element 30. Opening the switch element 30 will interrupt the passage of current from the first section 106 of the ground circuit 105 to the second section 107 of the ground circuit 105. Such interruption of the current along the ground circuit 105 will eliminate or substantially reduce the current along the first section 106 and eliminate the current along the second section 107 as well as the additional components of the system connected to the second section 107 such as the segment 108 of the multimedia connectivity module 17 and the host 19. Accordingly, the ground overcurrent control system 10 will protect the module-based electrical connector 20, the cable assembly 50, including the first and second electrical connectors 55, 60, components of the multimedia connectivity module 17 and the host 19 as well as the interconnections therebetween from damage due to excessive current passing along the ground circuit 105.

By opening the switch element 30, and the module-based electrical connector 20 to which the cable assembly 50 is connected will no longer be connected to the second section 107 of ground circuit 105. Ground overcurrent control system 10 further includes functionality to monitor the ground circuit 105 and restore the normal operation thereof once the configuration or issue causing the ground overcurrent condition has been eliminated. In particular, once the switch element 30 is open, relatively small amounts of current may pass through the cable assembly 50 to the module-based electrical connector 20 and along the auxiliary ground segment 115 until reaching the auxiliary ground reference 113. By configuring the first and second resistors 42, 43 to have a relatively large resistance, the current passing through the auxiliary ground segment 115 will be relatively small.

With the switch element 30 in its open position, data may be received at stage 76 by the ASIC 16 from the voltage sensor 41. As discussed above with respect to voltage sensor 36, the data from voltage sensor 41 may be received at any desired rate or frequency. In one example, the data may be received once every millisecond. At stage 77, the ASIC 16 may determine the voltage at the node 127. To do so, the ASIC 16 may receive signals from the voltage sensor 41 indicative of the voltage between node 127 and auxiliary ground reference 113 and across the second resistor 43. Based upon the voltage and the known resistance of the first and second resistors 42, 43, the voltage at the first section 106 of the ground circuit 105 may be determined.

As with the analysis of the current through the first and second sections 106, 107 of the ground circuit 105, in some applications, the ASIC 16 may be configured to analyze a plurality of data samples to determine the voltage at the first section 106 of the ground circuit 105. Such analysis may be performed in any desired manner. In one embodiment, the ASIC 16 may analyze a plurality of data samples over a predetermined period of time and utilize an average of the received data samples. In other embodiments or in addition, the ASIC 16 may analyze a plurality of data samples over a predetermined period of time and utilize the maximum of the receive data samples. In one example, the ASIC 16 may analyze groups of ten data samples to generate a voltage value. In some instances, procedures and methods may be utilized to eliminate erroneous data samples. Other processes are contemplated.

Upon determining the voltage at the first section 106 of the ground circuit 105, the ASIC 16 may compare the sensed voltage to the voltage threshold at decision stage 78 to determine whether the sensed voltage is below the voltage threshold. If the sensed voltage is not less than the voltage threshold, the switch element 30 may remain open and stages 76-78 repeated.

If the sensed voltage is less than the voltage threshold, the ASIC 16 may generate at stage 79 a signal along the electrical connection 31 to close the switch element 30. Closing the switch element 30 will reconnect the first and second sections 106, 107 of the ground circuit 105 and permit the passage of current from the first section 106 to the second section 107. Such reconnection of first and second sections 106, 107 of the ground circuit 105 will permit the operation of the module-based electrical connector 20 and the multimedia connectivity module 17 as desired and stages 71-74 repeated.

Other embodiments are contemplated. For example, other embodiments for determining when to close the switch element 30 may be provided. In one embodiment, the ASIC 16 may include a timer associated therewith and the switch element 30 closed after a predetermined period of time after opening the switch element 30. In another embodiment, the switch element 30 may remain open until a re-setting event occurs. For example, a re-setting event may be an interruption in power to the multimedia connectivity module 17 which may be caused by turning off and turning on the ignition or the auxiliary power of a vehicle. In such case, the ASIC 16 may re-set the switch element 30 to its closed position upon initializing power to the ground overcurrent control system 10 directly or indirectly such as by initializing power to the multimedia connectivity module 17. To do so, upon powering up the ground overcurrent control system 10 (or the multimedia connectivity module 17), the ASIC 16 may generate a command to modify the switch element 30 from the open position to the closed position to ensure that the switch element 30 is closed.

Figure 3:
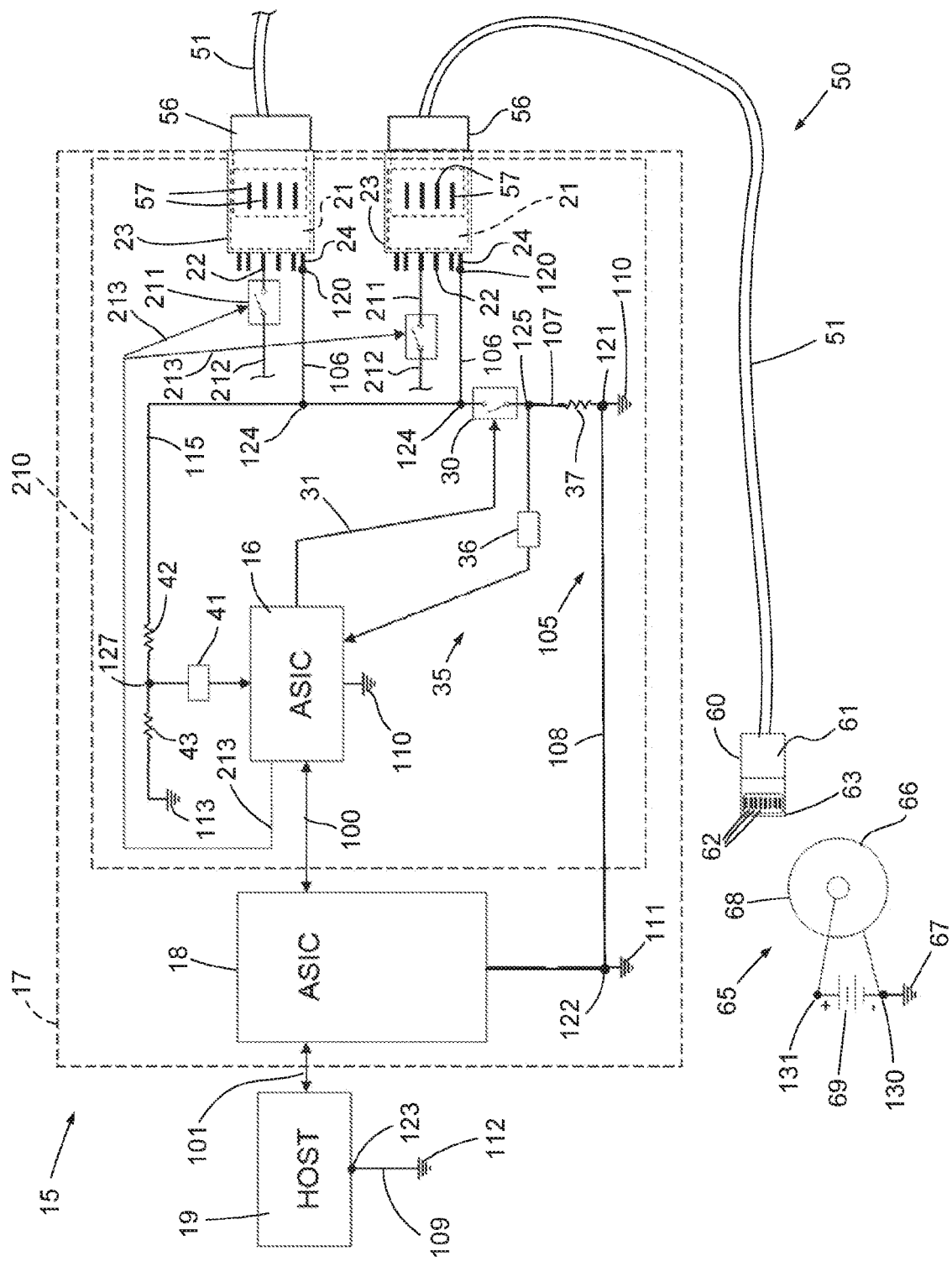
FIG. 3 illustrates a block diagram of a second exemplary embodiment of a system incorporating the ground overcurrent control system as described herein.

In another embodiment, a multimedia connectivity module (not shown) may include a plurality of module-based electrical connectors 20 with each connector being connected to a ground overcurrent control system 10. Referring to FIG. 3, in still another embodiment, multimedia connectivity module 17 may include a plurality of module-based electrical connectors 20 with the connectors being connected to a single ground overcurrent control system 210. Like components are indicated by like reference numbers. In some applications and under some circumstances, a signal terminal 62, such as a $V_{bus}$ signal terminal, of one of the electrical connectors of cable assembly 50, such as second electrical connector 60, may be electrically connected through electronic components in the connector 60 to the ground circuit 105 of the connector 20. Upon excessive current passing through one (or a first) of the cable assemblies 50 to the ground circuit 105, the switch element 30 will be moved from its closed position to its open position. However, if the other (or second) cable assembly 50 is connected to an electronic device such as a mobile phone, the excessive current on the first section 106 of the ground circuit 105 due to the first cable assembly may pass through the ground circuit of the second cable assembly and into the $V_{bus}$ signal terminal of the second cable assembly. The excessive current may pass through the $V_{bus}$ signal terminal and into the connected electronic device, potentially damaging the electronic device.

In order to avoid this result, the ground overcurrent control system 210 may include signal switch elements 211 to disconnect one or more signal terminals 22 (e.g., the $V_{bus}$ signal terminal) from the signal conductors 212 to which they are connected. More specifically, each signal switch element 211 is electrically connected to one of the signal terminals 22 and a signal conductor 212 of the ground overcurrent control system 210.

Each signal switch element 211 is configured to operate in a first or closed condition in which a signal terminal 22 and a signal conductor 212 are electrically connected and a second or open condition in which the signal terminal 22 and a signal conductor 212 are electrically isolated. In other words, each signal switch element 211 operates to open and close the connection between a signal terminal 22 and a signal conductor 212. As depicted in FIG. 3, each of the signal switch elements 211 is in the second condition with its signal terminal 22 and its respective signal conductor 212 electrically isolated.

Signal switch element 211 may be any type of switch that interrupts or diverts the flow of current. In one embodiment, the signal switch elements may be FETs, such as MOSFETs. In other embodiments, each signal switch element 211 may be an electromechanical switch such as a relay. As depicted in FIG. 3, the signal switch elements 211 are FETs and are operatively connected to the ASIC 16. More specifically, the signal switch elements 211 are actuated by signals from the ASIC 16 via electrical connection 213.

Operation of the ground overcurrent control system 210 may be substantially identical to that described above with respect to the ground overcurrent control system 10. However, upon determining that the current through the ground circuit switch element 30 exceeds the current threshold, the ASIC 16 sends commands via electrical connection 213 to open the signal switch elements 211 prior to sending a command to open the ground circuit switch element 30.

After the signal switch elements 211 are opened, the ground circuit switch element 30 may be opened. By opening the signal switch elements 211 prior to opening the ground circuit switch element 30, excessive current in the ground circuit 105 will not be transmitted through the ground circuit 105 of the connector 20 and into the signal terminal 22 such as a $V_{bus}$ terminal.

Once the ground circuit switch element 30 is opened, the ground overcurrent control system 210 monitors the voltage at node 127 as described above with respect to ground overcurrent control system 10 to determine whether an excess current condition remains on section 106 of ground circuit 105. Once the excess current condition has been eliminated, the ground circuit switch element 30 may be closed and then the signal switch elements 211 closed.

Other embodiments similar to the ground overcurrent control system 210 are contemplated. For example, other manners of re-setting the ground circuit switch element 30 and the signal switch elements 211 may be utilized such as those additional manners or re-setting the ground circuit switch element 30 as discussed above with respect to ground overcurrent control system 10.

While the disclosure is described and illustrated with the ground overcurrent control system 10 being part of the multimedia connectivity module 17, the ground overcurrent control system 10 may have any configuration such as part of a larger electronic unit, module, or system or as a standalone device.

While the disclosure is described and illustrated with regard to the ground overcurrent control system 10 utilizing an ASIC 16, it is to be understood than any other appropriate means, such as a microprocessor, state machine, or any discrete electronic solution, could be utilized.

While the disclosure is described and illustrated with regard to having a first and second sensor systems 35, 40, it is to be understood that a single sensor system performing the functionality of both the first and second sensor systems may be utilized.

While the disclosure is described and illustrated as having exemplary electrical connectors 20 and power outlet or receptacle 65, it is to be understood that other electrical connectors and power outlets could be provided as desired, and the disclosure should not be limited to the exemplary connectors and power outlets.

While the disclosure is described and illustrated as having resistors 37, 42, 43 having exemplary resistance values, it is to be understood that other resistance values may be used as desired.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A ground overcurrent control system, the ground overcurrent control system comprising:
   an electrical connector, the electrical connector including a ground member;
   a ground circuit, the ground circuit including a first section and a second section, the first section being electrically connected to the ground member of the electrical connector, the second section being electrically connected to a ground reference;
   a switch element operatively positioned between the first section of the ground circuit and the second section of the ground circuit, the switch element being configured to operate in a first condition in which the first section and the second section are electrically connected and a second condition in which the first section and the second section are electrically isolated;
   a first sensor system configured to generate first signals indicative of a current passing through the first and second sections of the ground circuit while the switch element is in the first condition;
   a controller configured to:
      store a current threshold;
      generate a command to modify the switch element from the second condition to the first condition upon initially providing power to the ground overcurrent control system;
      receive the first signals from the first sensor system;

determine the current within the ground circuit based upon the first signals while the switch element is in the first condition; and upon the current exceeding the current threshold, generate a command to modify the switch element from the first condition to the second condition; and a signal circuit and a signal switch element, and the electrical connector further comprising a signal contact;

the signal circuit including a first section and a second section, the first section of the signal circuit being electrically connected to the signal contact of the electrical connector, the signal switch element being operatively positioned between the first section of the signal circuit and the second section of the signal circuit, the signal switch element being configured to operate in a first condition in which the first section and the second section are electrically connected and a second condition in which the first section and the second section are electrically isolated, and the controller is further configured to:

upon the current exceeding the current threshold, generate a command to modify the signal switch element from the first condition to the second condition.

2. The system of claim 1, wherein the switch element is a MOSFET.

3. The system of claim 1, wherein the first sensor system comprises a voltage sensor.

4. The system of claim 3, wherein the first sensor system further comprises a resistance member.

5. The system of claim 4, wherein the resistance member is a discrete resistor disposed between the switch element and the ground reference.

6. The system of claim 4, wherein switch element has an internal resistance and the resistance member is the internal resistance of the switch member.

7. The system of claim 1, wherein the ground member of the electrical connector includes a shield that generally surrounds the electrical connector and a connection portion.

8. The system of claim 1, further including an auxiliary ground segment extending between the first section of the ground circuit and the ground reference, the auxiliary ground segment including at least one resistor.

9. The system of claim 1, wherein upon the current exceeding the current threshold, the controller is further configured to generate a command to modify the signal switch element from the first condition to the second condition before generating the command to move the switch element from the first condition to the second condition.

* * * * *